US008719165B2

(12) United States Patent
Roy

(10) Patent No.: US 8,719,165 B2
(45) Date of Patent: May 6, 2014

(54) DELEGATED TRANSACTIONS OVER MOBILE

(75) Inventor: Shaibal Roy, Kolkata (IN)

(73) Assignee: Empire Technology Development, LLC, Wilmington, DE (US)

( * ) Notice: Subject to any disclaimer, the term of this patent is extended or adjusted under 35 U.S.C. 154(b) by 879 days.

(21) Appl. No.: 12/502,132

(22) Filed: Jul. 13, 2009

(65) Prior Publication Data

US 2011/0010295 A1 Jan. 13, 2011

(51) Int. Cl.
*G06Q 20/40* (2012.01)
(52) U.S. Cl.
CPC ...................................... *G06Q 20/40* (2013.01)
USPC .............................................. 705/44; 705/41
(58) Field of Classification Search
CPC ...................................................... G06Q 20/40
USPC ......................................... 705/44, 65, 27, 40
See application file for complete search history.

(56) References Cited

U.S. PATENT DOCUMENTS

| 2002/0073416 | A1* | 6/2002 | Ramsey Catan | 725/6 |
| 2004/0034568 | A1* | 2/2004 | Sone | 705/26 |
| 2006/0224470 | A1* | 10/2006 | Garcia Ruano et al. | 705/27 |
| 2009/0198617 | A1* | 8/2009 | Soghoian et al. | 705/65 |
| 2010/0114733 | A1* | 5/2010 | Collas et al. | 705/26 |

OTHER PUBLICATIONS

Sun Life Financial Offers Its First Fee-based Variable Annuity. Business Wire. Feb. 24, 2011.*
How You Can Lose Money in a Money Fund. John Waggoner. USA Today. Mar. 1, 2010.*
MetLife Introduces Simple, Lower-Cost Variable Annuity. Business Wire. Jul. 20, 2009.*

\* cited by examiner

*Primary Examiner* — Kelly Campen
*Assistant Examiner* — John Preston
(74) *Attorney, Agent, or Firm* — Jensen & Puntigam, PS

(57) ABSTRACT

Systems and methods are described that generally relate to enabling completion of secure transactions using mobile devices that may or may not have the needed or desired security features. A secure transaction may be partially completed by a secure computing device and partially completed by a less secure mobile device, where the secure computing device may be used to delegate a transaction operation to the less secure mobile device.

18 Claims, 9 Drawing Sheets

DELEGATED TRANSACTIONS OVER MOBILE

BACKGROUND

Electronic transactions account for many of today's commercial interactions. For example, today's customers are familiar with online purchases of a wide range of goods such as computers, clothes, books, and food for delivery. In one scenario, a customer operates a full-featured and secure computing device to access a website operated by a merchant. The customer enters transaction data in a web-based form, and uses a website user interface to finalize the transaction. The merchant receives the transaction data, verifies payment, confirms that payment was received, confirms that the goods will be delivered accordingly, and subsequently delivers the goods.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings, in which:

DETAILED DESCRIPTION

Figure 1:
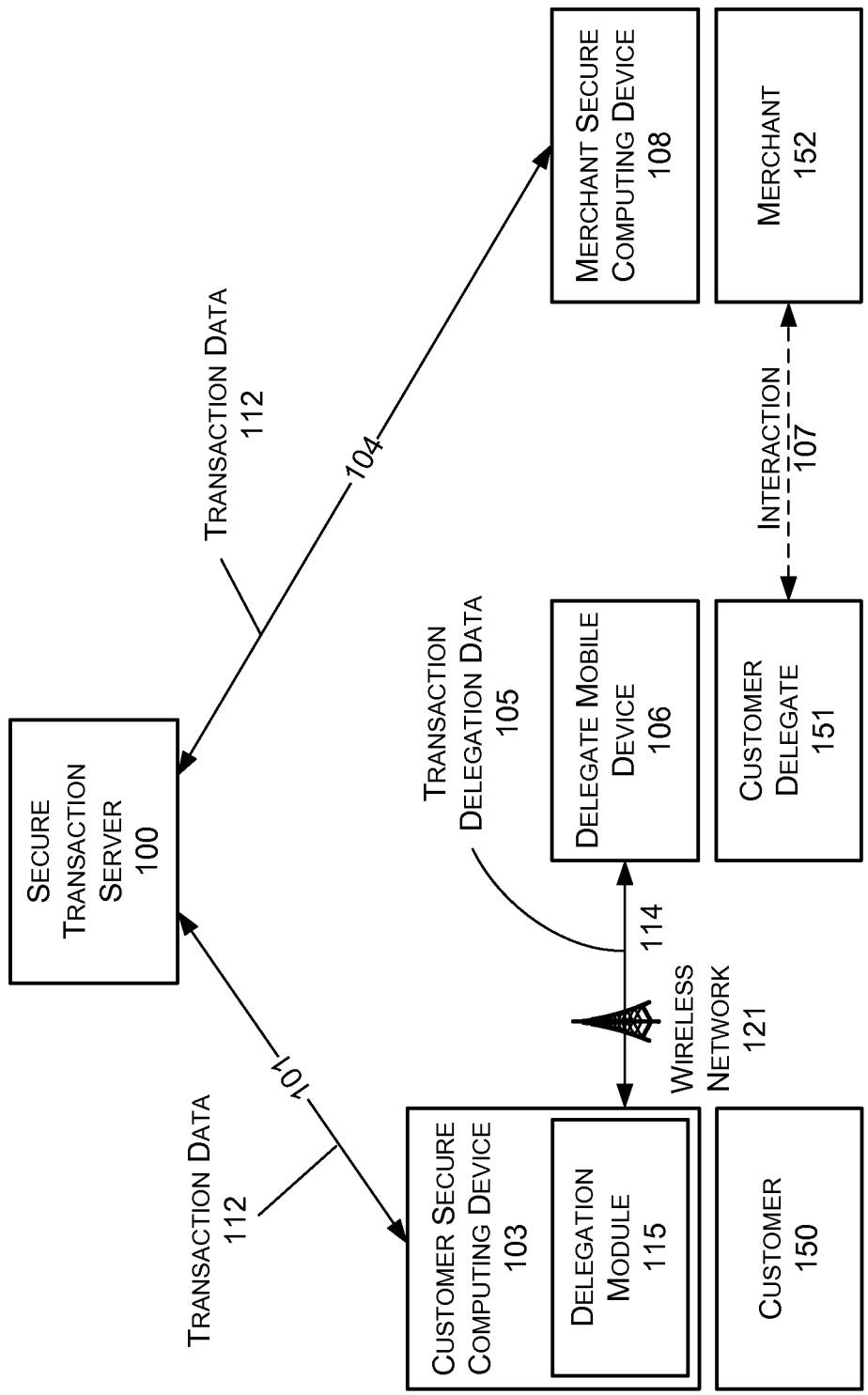
FIG. 1 is a block diagram illustrating example systems and methods for performing a delegated transaction with a customer delegate 151 in which a delegation module 115 is installed on a customer secure computing device 103.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made part of this disclosure.

Electronic transactions using mobile devices are currently much less common than those using a fully featured laptop or desktop computer, and the payment amounts involved in such transactions are generally much lower. This activity may increase as the capabilities of mobile devices improve, and as more powerful, more secure mobile devices gain greater market share. Today's mobile devices span a wide range of features and computing power, from limited-feature cellular telephones that may do little more than make voice calls and send and receive text messages, to "smart phones" which may have computing power and hardware and software features closer to a laptop computer.

While the prevalence of smart phones is rapidly expanding, it is predicted that many people throughout the world may continue to use more limited-feature cellular telephones which meet their basic communications needs at lower cost. Meanwhile, these late or non-adopters of smart phones may well have access to a fully featured and secure computer at home or at work, or may be employed by a person with access to such a fully featured and secure computer.

The present disclosure generally relates to systems and methods for enabling completion of secure transactions using mobile devices that may or may not have appropriate security features needed or desired for the transaction. In some embodiments, a transaction may be partially completed by a secure computing device, and partially completed by a mobile device. The secure computing device can be arranged to delegate one or more transaction operation(s) to the mobile device. For example, a customer may initiate a transaction from a customer secure computing device, such as, for example, a secure personal computer (PC) in the customer's home or office. Instead of completing the transaction, however, the customer may delegate a transaction operation to a delegate mobile device. Upon receiving an appropriate communication from the delegate mobile device, the customer secure computing device may then complete the transaction. Similarly, a merchant may delegate transaction operation(s) to delegate mobile device(s), as also described herein.

FIG. 1 is a block diagram illustrating example systems and methods for performing a delegated transaction with a customer delegate 151 in which a delegation module 115 is installed on a customer secure computing device 103, in accordance with the present disclosure. FIG. 1 includes secure transaction server 100, customer secure computing device 103, customer 150, delegate mobile device 106, customer delegate 151, merchant secure computing device 108, and merchant 152. Customer secure computing device 103 may comprise a delegation module 115.

In FIG. 1, secure transaction server 100 may be coupled to customer secure computing device 103 comprising delegation module 115 via a network connection 101, over which transaction data 112 may be transmitted. Customer secure computing device 103 may be coupled to delegate mobile device 106 via a network connection 114 comprising wireless network 121, over which transaction delegation data 114 may be transmitted. Secure transaction server 100 may be coupled to merchant secure computing device 108 via network connection 104, over which transaction data 112 may be transmitted.

An interaction 107 is contemplated between customer delegate 151 and merchant 152. FIG. 1 furthermore illustrates customer 150 just below customer secure computing device 103 to suggest customer operation of the customer secure computing device 103. Likewise, customer delegate 151 is illustrated just below delegate mobile device 106 to suggest delegate operation of the delegate mobile device 106; and merchant 152 is illustrated just below merchant secure computing device 108 to suggest merchant operation of the merchant secure computing device 108.

In FIG. 1, customer 150 may install the delegation module 115 on the customer secure computing device 103. Customer 150 may prepare a transaction by preparing transaction data 112 at the customer secure computing device 103. Customer 150 may choose to delegate a transaction operation to customer delegate 151 for example by entering a mobile device number of the delegate mobile device 106 via the customer secure computing device 103, and selecting appropriate user interface controls supplied by the delegation module 115. The delegation module 115 may be arranged to send, or cause customer secure computing device 103 to send, via connection 114 transaction delegation data 105 to the delegate mobile device 106. Customer delegate 151 may receive the transaction delegation data 105, for example in the form of a text message or other alert on delegate mobile device 106. Customer delegate 151 may then proceed to conduct the delegated transaction via interaction 107, whereby customer delegate 151 may for example procure desired services or products from merchant 152. After interaction 107, customer delegate 151 may send transaction delegation data 105 to customer secure computing device 103 via connection 114, for example in the form of a reply from delegate mobile device 106 to the text message or other alert sent by customer secure computing device 103. The transaction delegation data 105 sent in the reply may indicate that the requested merchant goods or services were successfully acquired. Upon receiving the reply, customer secure computing device 103 may be arranged to automatically complete the transaction by uploading transaction data 112 to the secure transaction server 100 via network connection 101. Secure transaction server 100 may in some embodiments be configured to perform one or more additional operations with respect to the transaction by communicating transaction data 112 with merchant secure computing device 108 over network connection 104.

Figure 5:
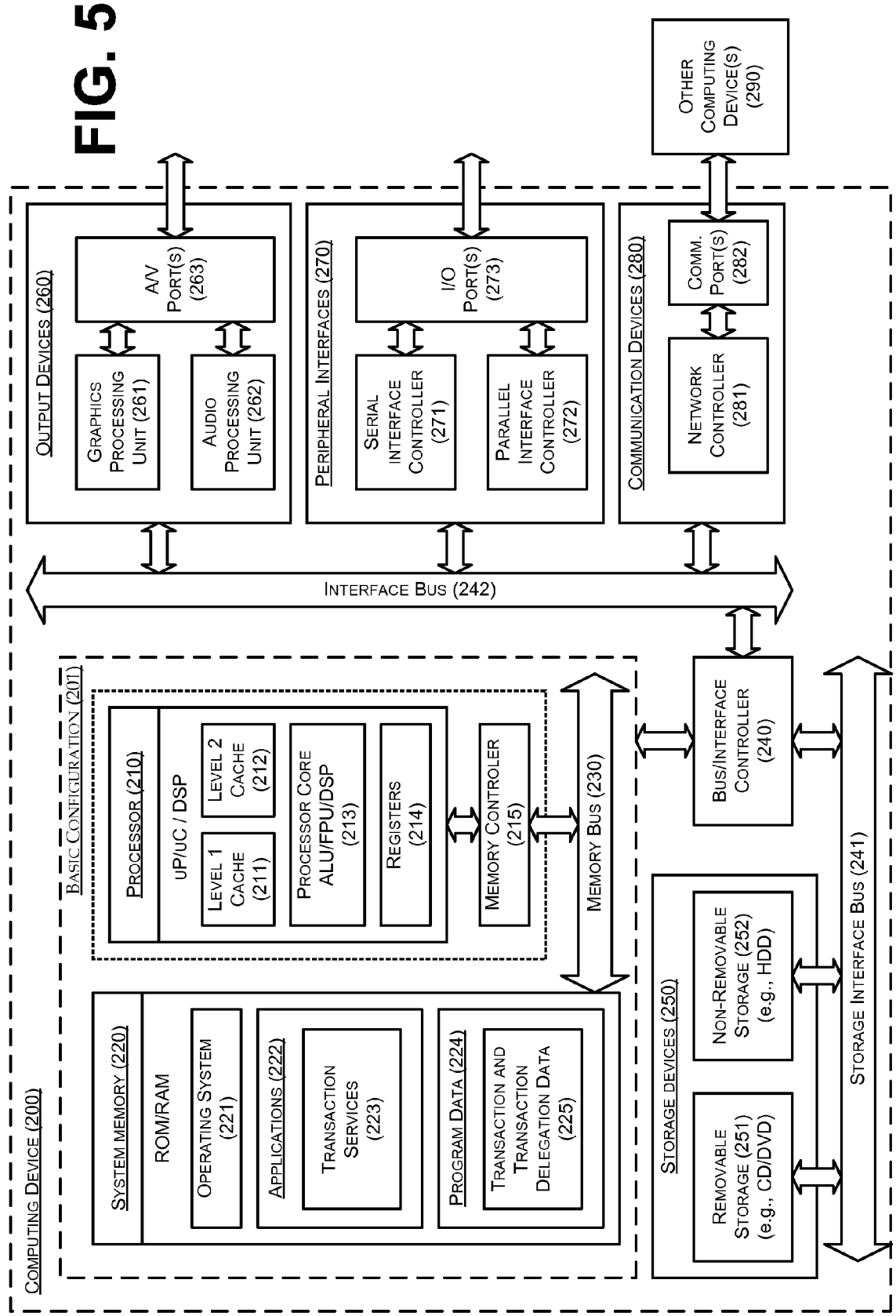
FIG. 5 is a block diagram illustrating a computing device 200 that may serve as any of the computing devices illustrated in FIG. 1-4.

In FIG. 1, customer secure computing device 103 may for example comprise a computing device as illustrated in FIG. 5, such as, for example, a Personal Computer (PC) equipped one of the WINDOWS® family of operating systems made by MICROSOFT® Corporation of Redmond, Wash., USA, or a computing device made by APPLE® Corporation of Cupertino, Calif., USA. The secure computing device 103 could also be a secure smart phone such as a smart phone running the WINDOWS MOBILE® brand operating system also made by MICROSOFT®, or an iPhone®, made by APPLE®, or any of the wide variety of other smart phone hardware and software combinations available from numerous suppliers today, or as may be developed in the future.

The delegation module 115 may comprise for example an application loaded onto a computing device 103. The delegation module 115 may comprise third-party software that may be downloaded via a network connection, installed from a Compact Disk (CD) or installed through some other media. In some embodiments, the delegation module could come as a feature of an operating system installed on customer secure computing device 103.

The delegation module 115 may supply features for interacting with customer 150, for example via appropriate User Interface (UI) features, as well as features for interacting with delegate mobile device 106 and secure transaction server 100, for example by accessing communications capabilities of the computing device 103.

In some examples, the delegation module 115 may supply UI prompting and/or providing commands and menu selections for customer entry of information for communicating with a delegate mobile device 106. An example UI may be arranged to facilitate entry of one or more of a telephone numbers, email addresses, Internet Protocol (IP) addresses, or other communication information. The delegation module 115 may also supply UIs to facilitate one or more of opening a new transaction with a merchant 152, entering transaction data 112, storing the transaction data 112, configuring transaction delegation data 105 to be sent to delegate mobile device 106, and/or delegating a transaction operation to delegate mobile device 106. Once sufficient delegate mobile device 106 and transaction data 112 is acquired for a particular transaction, the UI for delegating a transaction operation may for example comprise a button or menu item to facilitate the customer 150 selection to "delegate now".

Transaction data 112 may include for example a variety of data relating to a transaction. This may include one or more of a merchant identification, a customer identification, transaction delegation data, an authorized payment amount, a provisional customer payment funds source identification such as customer bank routing and account numbers and/or credit or debit card information, an identification of goods, desired properties and/or qualities of the goods, a quantity of goods, a time of delivery or pick-up, customer discounts, coupons, or membership information to be applied to the transaction, and/or any other information relating to a transaction. Transaction data 112 is illustrated in FIG. 1 as being transmitted across network connections 101 and 104. Such transmissions of transaction data 112 may include all transaction data 112 from computing device 103, or portions thereof as appropriate for transaction completion.

Transaction delegation data 105 may comprise delegate mobile device 106 identification information, such as a telephone number, for a delegate mobile device 106 associated with a customer delegate 151 that is authorized to enter a delegated transaction operation with the merchant 152. Transaction delegation data 105 may also comprise any of the transaction data 112 identified above. To protect security, some embodiments may specifically not include certain information in transaction delegation data 105, such as a provisional customer payment funds source identification. In some embodiments, transaction delegation data 105 may include custom instructions for a customer delegate 151, for example, instructions regarding desired time of procuring goods from merchant 152, or instructions regarding a time for returning procured goods to customer 150.

The delegation module 115 may be arranged to communicate with delegate mobile device 106 by accessing the various communications connections, ports, hardware, and/or peripheral devices associated with computing device 103 to send transaction delegation data 105 to the mobile device 106. For example, where the delegate mobile device 106 is identified by a telephone number, a so-called Voice Over IP (VOIP) or other service may be accessed allowing communications between a computing device 103 on an IP network and a mobile device 106 connected to a wireless network 121 such as a cellular communications network. Where the delegate mobile device 106 is identified by an IP address, any of the various IP-based communications protocols may be used.

In some embodiments, the transaction delegation data 105 may be sent in the form of a voice or Short Message Service (SMS) text message to the mobile device 106. In either case, the message may be configured by the customer 150, or automatically configured by the delegation module 115 using transaction data 112, or a combination of these. Automatically configured message elements may be copied from transaction data 112 provided by the customer 150. Customer-configured aspects may be gathered by prompting a customer to record or type information for the transaction delegation data 105. Transaction delegation data 105 may depend, in some embodiments, upon security considerations pertaining to delegate mobile device 106 which may affect the form, amount, and types of data that may be securely sent to delegate mobile device 106. In such embodiments, transaction delegation data 105 may be encrypted, redacted and/or encoded to adapt to the security level of the mobile device 106.

Customer delegate 151 may be the same person as the customer 150, in the case where the customer 150 desires to delegate a transaction to him or herself for later completion from his or her mobile device. Customer delegate 151 may also be another person, such as a friend, family member, or employee of the customer 150. Customer delegate 151 receives the transaction delegation data 105 on the delegate mobile device 106, perform the delegated transaction operation via interaction 107, which may be, for example, a live interaction between customer delegate 151 and merchant 152, or may be some other type of interaction such as the customer delegate 151 making a purchase via a merchant website or other automated merchant device such as a gas pump equipped with payment apparatus, and send a communication comprising transaction delegation data 105 back to computing device 103.

The delegate mobile device 106 that receives the transaction delegation data 105 may be any mobile device, including but not limited to a cellular telephone, a pager, a laptop computer, a vehicle navigation and communications system, or any other mobile communications device.

The transaction delegation data that is sent to the computing device 103 may include some or all of the transaction delegation data 105 that was initially sent to the device 106, and may also include additional information identifying a status of the delegated transaction operation. For example, where a transaction is identified by a transaction identifier (ID), the transaction ID may be included in both the initial transaction delegation data 105 sent to the delegate mobile device 106, and the return communication from mobile device 106 to computing device 103. The return communication may further include a status identifier such as "complete", indicating that the transaction operation was successfully completed via interaction 107, or "incomplete", indicating that the transaction operation was not successfully completed via interaction 107. Other useful status identifiers are also feasible in some embodiments, including, for example, "approved" and "rejected" indicating whether payment was approved or rejected. Payments may be rejected for example in cases where identity theft is suspected. In such a scenario, a subsequent reply from computing device 103 with information indicating the authorization (or lack of authorization) of the delegate 151 may be implemented. Furthermore, in those cases where information is received indicating that identity theft may be involved, the computing device 103 may be further equipped via delegation module 115 to alert the customer and/or credit card or bank authorities.

The delegation module 115 may be configured to automatically take action upon receiving transaction delegation data 105 from the mobile device 106. If the received data indicates that goods or services are received according to the delegated transaction, e.g., if the status identifier in the above example is "complete", then the delegation module 115 may automatically initiate payment to the merchant in response to receiving the communication from the delegate mobile device 106. The delegation module 115 may also automatically send a subsequent communication to appropriate persons to advise them of transaction status, e.g., complete or incomplete. For example, an email may be sent to a customer 150 email address to advise the customer of transaction status.

In some embodiments, the delegation module 115 may automatically initiate payment to the merchant by automatically and securely sending transaction data 112 to secure transaction server 100. Transaction data 112 may be secured for example by encryption, using any of the various secure transmission protocols presently in use or as may be developed. The secure transaction server 100 and merchant secure computing device 108 are illustrated as separate components in FIG. 1, however it is predicted that in some embodiments these components may be combined into a single component operated by the merchant 152. Alternatively, the secure transaction server 100 may be operated by a bank, such as a customer bank responsible for a provisional customer payment funds source, and such bank may initiate payment on the transaction and optionally also send transaction data 112 to computing device 108.

In some embodiments, secure transaction server 100 may be implemented in a distributed arrangement, for example by servers operated by one or more banks. For example, transaction data 112 may be initially sent to a customer bank, which implements some transaction server 100 functions, then forwards some transaction data 112 to a merchant bank. The customer bank may also initiate an Electronic Funds Transfer (EFT) or other payment to the merchant bank. The merchant bank may also perform some transaction server 100 functions, may receive and process the EFT or other payment, and may forward the transaction data 112 to device 108.

Figure 2:
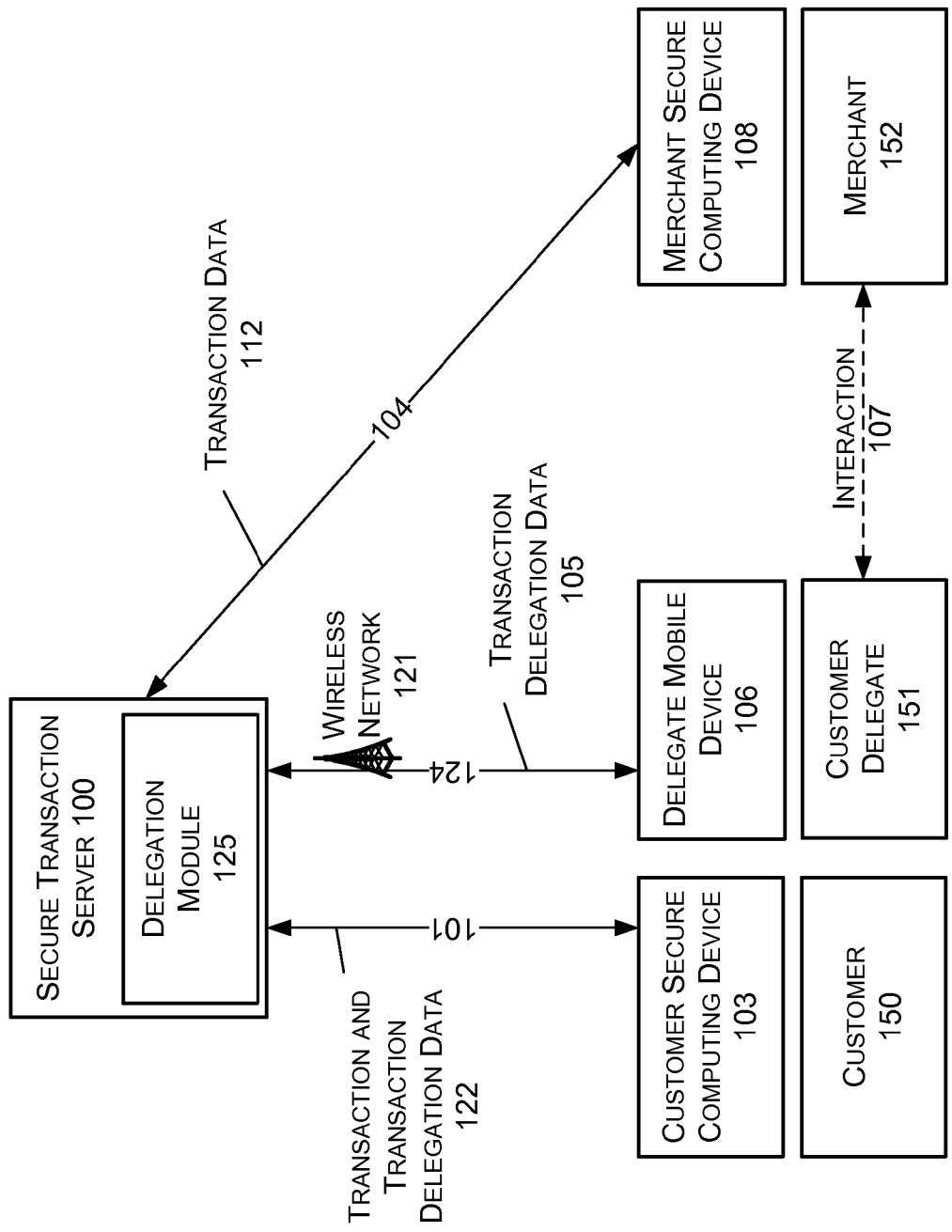
FIG. 2 is a block diagram illustrating example systems and methods for performing a delegated transaction with a customer delegate 151 in which a delegation module 125 is installed on a secure transaction server 100.

FIG. 2 is a block diagram illustrating example systems and methods for performing a delegated transaction with a customer delegate 151 in which a delegation module 125 is installed on a secure transaction server 100, arranged in accordance with the present disclosure. FIG. 2 includes secure transaction server 100, customer secure computing device 103, customer 150, delegate mobile device 106, customer delegate 151, merchant secure computing device 108, and merchant 152. Secure transaction server 100 comprises a delegation module 125.

In FIG. 2, secure transaction server 100 may be coupled with customer secure computing device 103 via a network connection 101 over which transaction and transaction delegation data 122 may be transmitted. Secure transaction server 100 may also be coupled with delegate mobile device 106 via a network connection 124 comprising wireless network 121 over which transaction delegation data 105 may be transmitted. Secure transaction server 100 may further be coupled with merchant secure computing device 108 via network connection 104 over which transaction data 112 may be transmitted.

A interaction 107 is contemplated between customer delegate 151 and merchant 152. FIG. 2 furthermore illustrates customer 150 just below customer secure computing device 103 to suggest customer operation of the customer secure computing device 103. Likewise, customer delegate 151 is illustrated just below delegate mobile device 106 to suggest delegate operation of the delegate mobile device 106; and merchant 152 is illustrated just below merchant secure computing device 108 to suggest merchant operation of the merchant secure computing device 108.

FIG. 2 presents many aspects which can be understood from the above description of FIG. 1, and like elements are identified using like identifiers. In general, FIG. 2 presents embodiments where a delegation module 125 is installed on secure transaction server 100. Secure transaction server 100 may be arranged to procure transaction and transaction delegation data 122, for example by providing UI such as in FIG. 1 via a website form whereby customers may enter appropriate data. Customer 150 may prepare a transaction by supplying transaction and transaction delegation data 122 to the secure transaction server 100 from the customer secure computing device 103. Customer 150 may choose to delegate the transaction to customer delegate 151 by, for example, entering a mobile device number of the delegate mobile device 106, and selecting an appropriate user interface control supplied by the delegation module 125. The delegation module 125 may be arranged to send or causes secure transaction server 100 to send transaction delegation data 105 via network connection 124 to the delegate mobile device 106. Customer delegate 151 may receive the transaction delegation data 105, for example in the form of a text message or other alert on delegate mobile device 106. Customer delegate 151 may then proceed to conduct the delegated transaction operation via interaction 107, whereby customer delegate 151 may for example procure desired services or products from merchant 152. Customer delegate 151 may send transaction delegation data 105 to the delegation module 125 via connection 124, for example in the form of a reply to the text message or other alert sent by secure transaction server 100, indicating that the requested merchant goods or services were successfully acquired. Upon receiving the reply, secure transaction server 100 may be arranged to automatically complete the transaction. For example, in embodiments where secure transaction server 100 may be operated by a bank, the secure transaction server 100 may be configured to initiate a payment from a customer provisional payment funds source to a merchant. In embodiments where secure transaction server 100 may be operated by a merchant, the secure transaction server 100 may be configured to send an appropriate request to a bank or other financial institution to initiate a funds transfer from a customer provisional payment funds source to the merchant. As in FIG. 1, secure transaction server 100 may in some embodiments be arranged to perform one or more additional operations with respect to the transaction by communicating transaction data 112 with merchant secure computing device 108 over network connection 104.

In FIG. 2, the delegation module 125 may be installed on secure transaction server 100. Transaction server 100 may for example comprise a computing device as illustrated in FIG. 5. In some embodiments, secure transaction server 100 may comprise a WINDOWS®, LINUX®, or UNIX® operating environment, equipped with commercial application server software such as the WEBSPHERE® brand products made by IBM® Corp. of Armonk, N.Y. or ORACLE® brand products made by ORACLE® Corp. of Redwood City, Calif., USA. Transaction server 100 may be implemented in a distributed arrangement as described above, for example, by a customer bank server that is communicatively coupled to a merchant bank server, each of which make use of transaction data 112 to complete a transaction.

The delegation module 125 may be accessed from customer device 103 via a network connection 101, for example by using a secure browser application such as INTERNET EXPLORER® or FIREFOX® brand browser applications executing at customer device 103 to access a website supported by transaction server 100 and available via the internet. In some embodiments, the delegation module 125 may be configured to supplement any existing transaction support technologies implemented on the transaction server 100. For example, in a scenario where the delegation module 125 may be used to supplement existing e-commerce features provided by a merchant web site, the existing e-commerce features such as existing goods and services identification and credit card payment forms may be left in place, and supplemented by an option allowing delegation of a transaction operation to a mobile device 106. Instead of completing the transaction during a secure session with customer device 103, the delegation module 125 may be arranged to cause the transaction server 100 to wait until a reply communication is received from the mobile device 106 to initiate payment from the provisional payment funds source identified for the transaction. A secure session, as the term is used herein, indicates one or more communications between computing devices in which the identity of a user of at least one of the computing devices is authenticated to the other computing device. One example of a secure session includes the interaction between two computing devices beginning when a user "logs on" to a service, for example by providing a username and password, and ending when an user "logs off" for example by selecting a control which ends the secure session. Other examples need not require user action, but may entail automatic log-on or behind-the scenes exchange of security certificates and the like.

Figure 3:
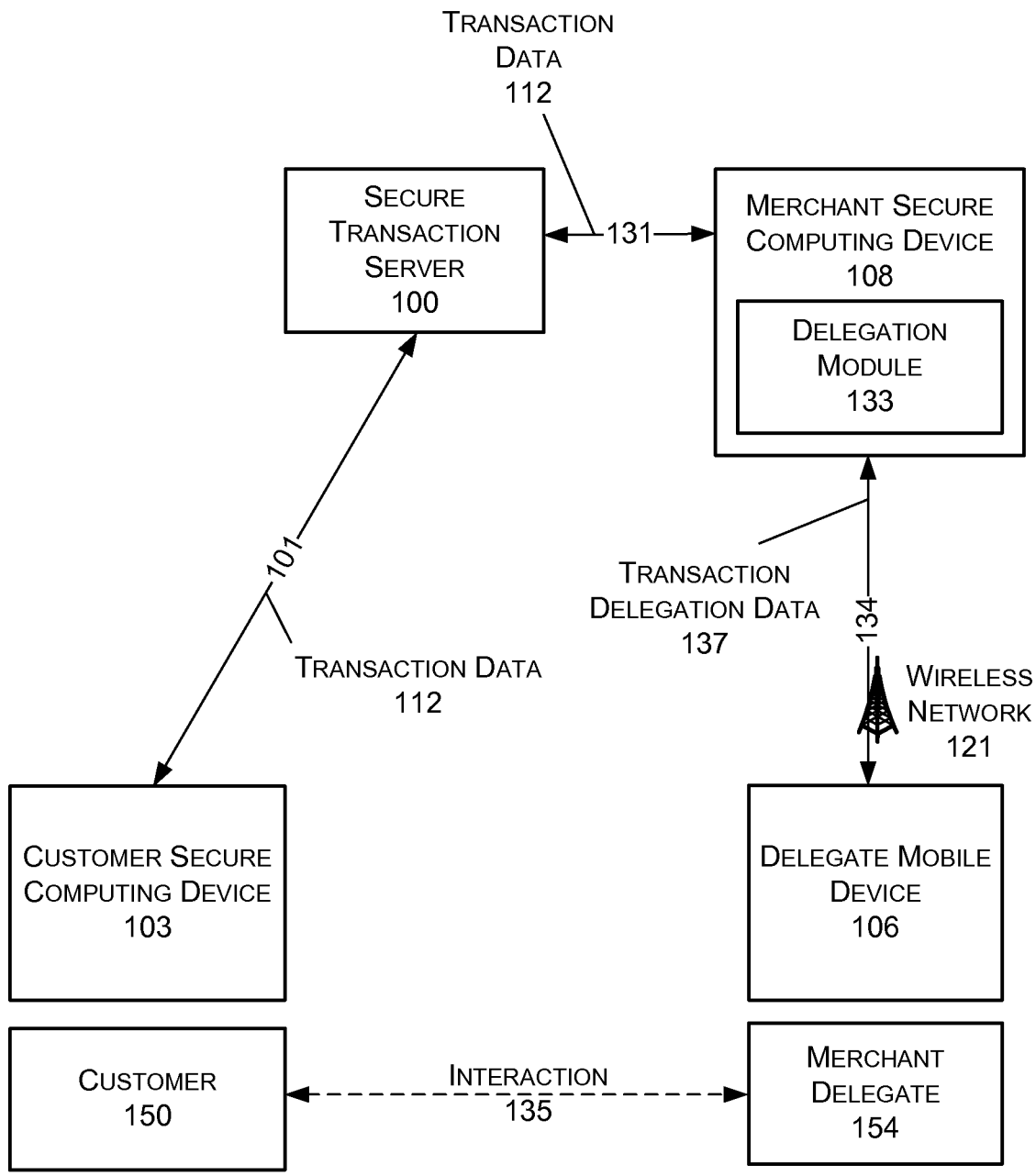
FIG. 3 is a block diagram illustrating example systems and methods for performing a delegated transaction with a merchant delegate 154 in which a delegation module 133 is installed on a merchant secure computing device 132.

FIG. 3 is a block diagram illustrating example systems and methods for performing a delegated transaction with a merchant delegate 154 in which a delegation module 133 is installed on a merchant secure computing device 108, in accordance with the present disclosure. FIG. 3 includes secure transaction server 100, customer secure computing device 103, customer 150, delegate mobile device 106, merchant secure computing device 108, and merchant delegate 154. Merchant secure computing device 108 comprises a delegation module 133.

In FIG. 3, secure transaction server 100 may be coupled with customer secure computing device 103 via a network connection 101, over which transaction data 112 may be transmitted. Merchant secure computing device 108 may be coupled with delegate mobile device 106 via a network connection 134 comprising wireless network 121, over which transaction delegation data 137 may be transmitted. Secure transaction server 100 may be coupled with merchant secure computing device 108 via network connection 131, over which transaction data 112 may be transmitted. An interaction 135 is contemplated between customer 150 and merchant delegate 154. FIG. 3 furthermore illustrates customer 150 just below customer secure computing device 103 to suggest customer operation of the customer secure computing device 103. Likewise, merchant delegate 154 is illustrated just below delegate mobile device 106 to suggest delegate operation of the delegate mobile device 106.

FIG. 3 presents many aspects which can be understood from the above description of FIG. 1, and like elements are identified using like identifiers. In general, FIG. 3 presents embodiments where a delegation module 133 may be installed on merchant secure computing device 108. Secure transaction server 100 may be arranged to acquire transaction data 112, for example by providing a website form accessible from customer device 103, whereby customers may enter or select appropriate data. Transaction data 112 may be relayed from the secure transaction server 100 to the merchant secure computing device 108. In some embodiments, transaction server 100 and secure computing device 108 may be combined into a single component. Transaction delegation data 137 may be optionally supplied at the merchant secure computing device 108 and optionally sent to the delegate mobile device 106. Payment from a provisional payment funds source identified for the transaction may be delayed pending customer 150 approval of the goods or services to be delivered in interaction 135. Upon receiving an indication of customer approval, for example from the customer device 103 or delegate mobile device 106, the delegation module 133 may be configured to automatically complete the transaction by initiating payment from the provisional payment funds source identified for the transaction.

Transaction delegation data 137 as implemented in FIG. 3 and FIG. 4, discussed below, may contain some transaction delegation data such as that described with reference to FIG. 1 and FIG. 2, above. Transaction delegation data 137 may also include or omit certain data to support delegation to a merchant delegate instead of a customer delegate. For example, instead of a requested pick-up time, transaction delegation data 137 may supply a requested delivery time. Transaction delegation data 137 may also supply one or more of a deliver address, customer name, and/or any custom data or instructions as may be provided by the merchant.

In some embodiments, customer approval of goods or services may be made in a subsequent secure session between customer device 103 and transaction server 100. For example, when goods are delivered to a customer residence, the customer may inspect the goods, then open a secure session between customer device 103 and transaction server 100 and/or merchant secure computing device 108 to approve (or reject) the goods via interaction with a user interface supplied by delegation module 133. In response to the indication of customer approval, the delegation module 133 may be arranged to automatically initiate payment on the transaction, and send a communication to delegate mobile device 106 to confirm customer payment.

In some embodiments, customer approval of goods or services may be received at delegation module 133 via a communication from the delegate mobile device 106. For example, a communication with transaction identifier and transaction status such as "approved" or "rejected" may be sent from delegate mobile device 106 to delegation module 133. In another example, a delegation module 133 may be configured to supply the customer with an approval code at the time the customer initially sets up a transaction by supplying transaction data 112. The customer 150 may then supply the approval code to delegate 154 during interaction 135, indicating approval of the delivered goods. The approval code may be sent from delegate mobile device 106 to merchant secure computing device 108 and delegation module 133. In response to such communication, the delegation module 133 may be configured to automatically initiate payment on the transaction, and automatically send a communication to delegate mobile device 106 to confirm customer payment.

In alternative embodiments, which may also be understood with reference to FIG. 3, merchant may prepare delivery of goods or services to customer 150 by supplying transaction delegation data 137 at the merchant secure computing device 108. The merchant may choose to delegate a transaction operation to the merchant delegate 154 by, for example, entering the mobile device number of delegate mobile device 106. The delegation module 133 may be configured to send or cause merchant secure computing device 108 to send via communication connection 134 transaction delegation data 137 to the delegate mobile device 106. Merchant delegate 154 receives the transaction delegation data 137, for example in the form of a text message or other alert on delegate mobile device 106. Merchant delegate 154 then proceeds to conduct the delegated transaction via interaction 107, whereby merchant delegate 154 may deliver goods or services and/or receive payment for the goods or services provided and verify the customer's approval that the goods are satisfactory and delivered as specified. After receiving payment, merchant delegate 151 may send transaction delegation data to the merchant secure computing device 108 via communication connection 134, for example in the form of a reply to the text message or other alert sent by merchant secure computing device 108, indicating that the requested merchant goods or services were successfully delivered with customer approval, and payment received. Upon receiving the reply, merchant secure computing device 108 may be configured to automatically send payment received confirmation(s)/receipts by uploading transaction data 112 to the secure transaction server 100 and/or sending such information to customer device 103.

Transaction server 100 may be implemented in a distributed arrangement as described above. In embodiments illustrated in FIG. 3 and FIG. 4, an example distributed arrangement may comprise servers operated by customer and merchant banks. Transaction data 112 may be initially sent to a merchant bank, which implements some transaction server 100 functions, then forwards some transaction data 112 to a customer bank. The merchant bank may also initiate an EFT or other payment to the customer bank. The customer bank may also perform some transaction server 100 functions, may receive and process the EFT or other payment, and may forward the transaction data 112 to device 103.

Figure 4:
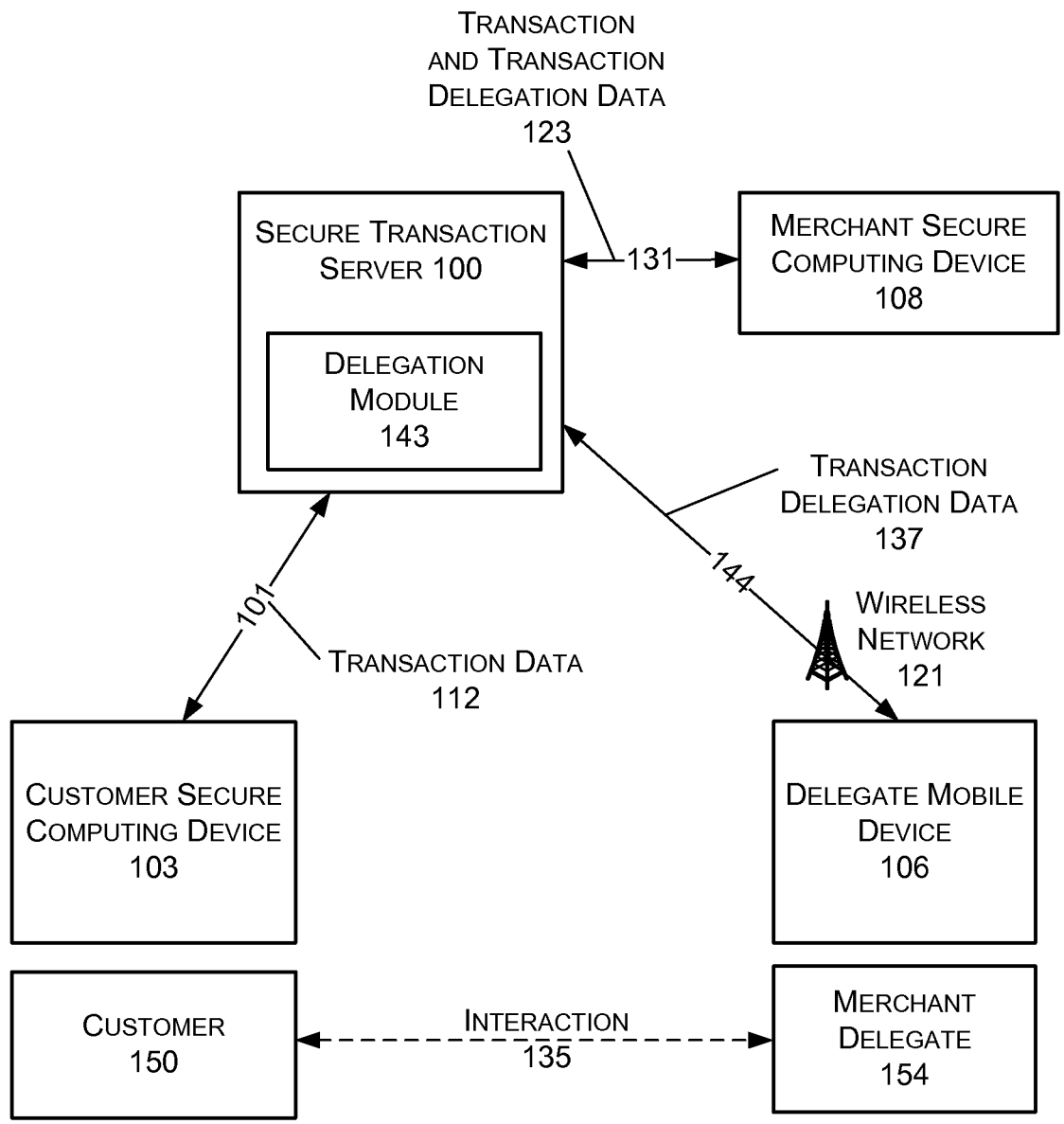
FIG. 4 is a block diagram illustrating example systems and methods for performing a delegated transaction with a merchant delegate 154 in which a delegation module 143 is installed on a secure transaction server 100.

FIG. 4 is a block diagram illustrating example systems and methods for performing a delegated transaction with a merchant delegate 154 in which a delegation module 143 is installed on a secure transaction server 100. FIG. 4 includes secure transaction server 100, merchant secure computing device 108, customer secure computing device 103, customer 150, delegate mobile device 106, merchant delegate 154. Secure transaction server 100 comprises a delegation module 143.

In FIG. 4, secure transaction server 100 may be coupled with customer secure computing device 103 via a network connection 101, over which transaction data 112 may be transmitted. Secure transaction server 100 may also be coupled with merchant secure computing device 108 via a network connection 131, over which transaction and transaction delegation data 123 may be transmitted. Secure transaction server 100 may also be coupled with delegate mobile device 106 via network connection 144 comprising wireless network 121, over which transaction delegation data 137 may be transmitted.

An interaction 135 is contemplated between customer 150 and merchant delegate 154. FIG. 4 furthermore illustrates customer 150 just below customer secure computing device 103 to suggest customer operation of the customer secure computing device 103. Likewise, merchant delegate 154 is illustrated just below delegate mobile device 106 to suggest merchant delegate operation of the delegate mobile device 106.

FIG. 4 presents many aspects which can be understood from the above description of FIG. 3, and like elements are identified using like identifiers. In general, FIG. 4 presents embodiments similar to that of FIG. 3, except delegation module 143 may be installed on secure transaction server 100 instead of merchant secure computing device 108. Delegation module 143 may provide many of the same features as delegation module 133, described above. In FIG. 4, however, the delegation module 143 may be accessed remotely by the merchant from merchant secure computing device 108. For example, in embodiments where the delegation module 143 may be supplied by a customer or merchant bank responsible for funds involved in a transaction, the merchant may supply a delegate mobile device 106 number to the delegation module 143 so that such third party can notify merchant delegate 154 when payment is received.

In FIG. 4, the delegation module 143 may be installed on a secure transaction server 100. Merchant may prepare a delivery of goods or services to customer 150 by acquiring transaction and transaction delegation data 123 at the merchant secure computing device 132. Merchant may supply transaction and transaction delegation data 123 to the secure transaction server 100 via a network connection 131. A transaction operation may be delegated to merchant delegate 154 for example by entering or selecting a mobile device number of the delegate mobile device 106, and selecting an appropriate user interface control supplied by the delegation module 143 on the secure transaction server 100. The delegation module 143 may be configured to then perform the various functions described above with reference to FIG. 3 and delegation module 133.

Transaction server 100 may be implemented in a distributed arrangement as described above, for example, by a merchant bank server that is communicatively coupled to a customer bank server, each of which make use of transaction data 112 to complete a transaction.

FIG. 5 is a block diagram illustrating a computing device 200 that may serve as any of the computing devices illustrated in FIG. 1-4. In a very basic configuration 201, computing device 200 typically includes one or more processors 210 and system memory 220. A memory bus 230 may be used for communicating between the processor 210 and the system memory 220.

Depending on the desired configuration, processor 210 may be of any type including but not limited to a microprocessor (µP), a microcontroller (µC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Depending on the desired configuration, the system memory 220 may be of any type including but not limited to volatile memory (such as RAM), non-volatile memory (such as ROM, flash memory, etc.) or any combination thereof. System memory 220 typically includes an operating system 221, one or more applications 222, and program data 224. Applications 222 may include transaction services modules 223, which may include for example the various delegation modules described above in connection with FIG. 1-4. Program Data 224 may include transaction and transaction delegation data 225 as also discussed above. In some embodiments, application 222 may be arranged to operate with program data 224 on an operating system 221 such that secure transactions may be processed in accordance with the processes, methods and operations described herein. This described basic configuration is illustrated in FIG. 5 by those components within dashed line 201.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 220, removable storage 251 and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 include a serial interface controller 271 or a parallel interface controller 272, which may be configured to communicate with external devices such as input devices (e.g., keyboard, mouse, pen, voice input device, touch input device, etc.) or other peripheral devices (e.g., printer, scanner, etc.) via one or more I/O ports 273. An example communication device 280 includes a network controller 281, which may be arranged to facilitate communications with one or more other computing devices 220 over a network communication via one or more communication ports 282.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media.

Computing device 200 may be implemented as a portable (or mobile) electronic device such as a cell phone or a personal data assistant (PDA). Computing device 200 may also be implemented as a personal computer (PC) including both laptop computer and non-laptop computer configurations.

Figure 6:
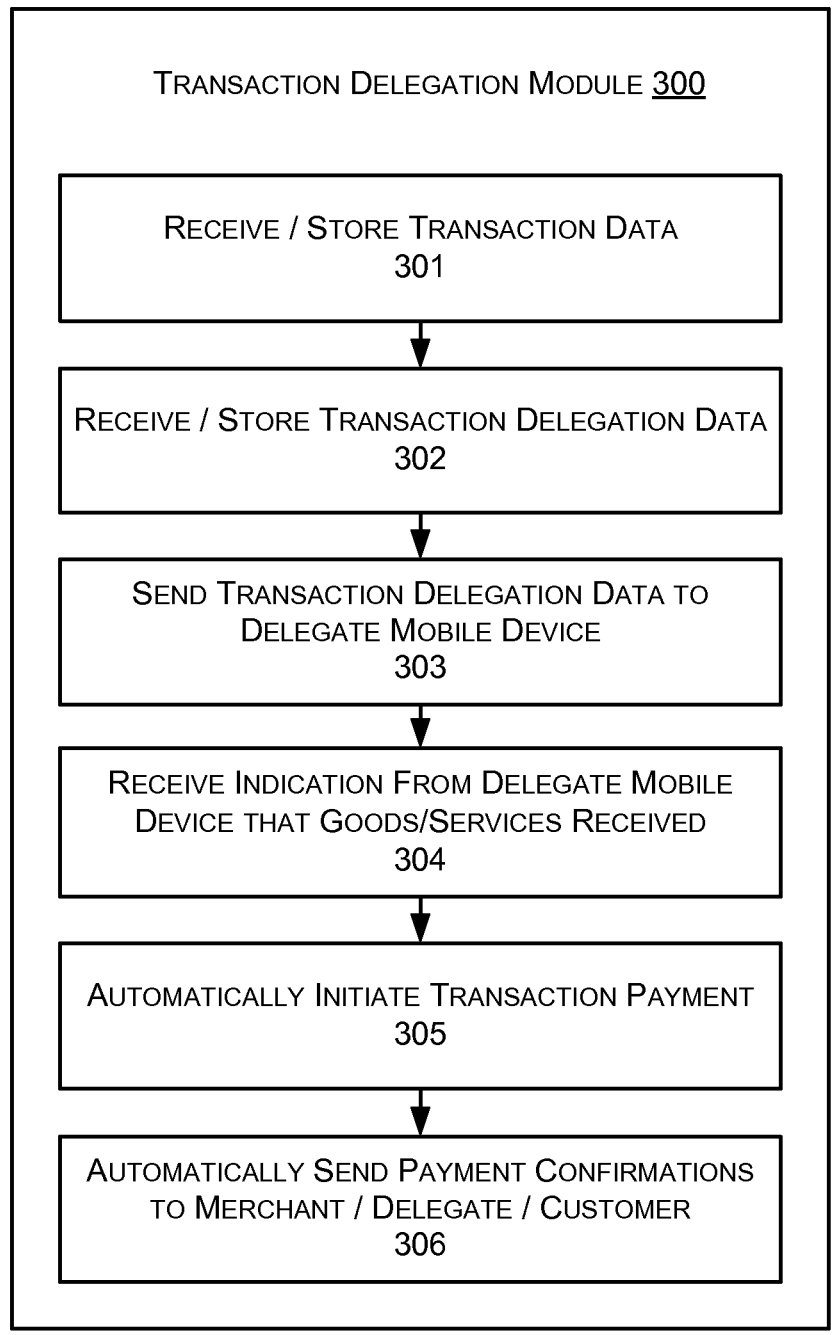
FIG. 6 is a flow diagram illustrating an example method that may be performed in connection with completing a delegated transaction.

FIG. 6 is a flow diagram illustrating an example method that may be performed in connection with completing a delegated transaction, in accordance with the present disclosure. FIG. 6 also represents modules as may be included in a transaction delegation module 300, for example, a delegation module for use in connection with FIG. 1 or FIG. 2. In FIG. 6, operations/modules 301-306 are illustrated as being performed sequentially, with operation/module 301 first and operation/module 306 last. It will be appreciated however that these operations/modules may be re-ordered as convenient to suit particular embodiments, and that these operations/modules or portions thereof may be performed concurrently in some embodiments.

Delegation module 300 may include one or more of operations/modules 301-306. Operations/modules 301-301 include a "Receive and Store Transaction Data" operation/module 301, a "Receive and Store Transaction Delegation Data" operation/module 302, a "Send Transaction Delegation Data to Delegate Mobile Device" operation/module 303, a "Receive Indication From Delegate Mobile Device that Goods/Services Received" operation/module 304, a "Automatically Initiate Transaction Payment" operation/module 305, and/or a "Automatically Send Payment Confirmations to Merchant/Delegate/Customer" operation/module 306.

In a "Receive and Store Transaction Data" operation/module 301, a customer may be prompted to enter or select transaction data comprising, for example, one or more of a merchant identification, a goods identification, a provisional customer payment funds source identification, and any other transaction data as previously described above. This entered transaction data may be received, for example, via the UI transaction data entry fields displayed to a user, and stored in the memory of a secure customer computing device or transaction server.

In a "Receive and Store Transaction Delegation Data" operation/module 302, a customer may be prompted to enter or select transaction delegation data comprising, for example, a cellular telephone number or other communications identifier for a mobile device as discussed above. Instructions for the customer delegate concerning time of pick-up, price, merchant location, and any additional instructions that will enable the customer delegate to complete the transaction and procure the goods and services may also be provided in some embodiments. This entered transaction delegation data may also be received, for example, via UI transaction data entry fields displayed to a user, and stored in the memory of a secure customer computing device or transaction server.

In a "Send Transaction Delegation Data to Delegate Mobile Device" operation/module 303, the delegation data may be sent to the delegate mobile device associated with a customer delegate. This includes the instructions and information described above with reference to operation 302. In some embodiments, this communication specifically does not include sensitive information such as any bank account or credit card numbers to be used for the transaction, and the level of security for communicating with the delegate mobile device can be low, for example by not including encryption or any enhanced security features of the receiving mobile device.

In a "Receive Indication From Delegate Mobile Device that Goods/Services Received" operation/module 304, one or more communications from a delegate mobile device may be received at a secure customer computing device or transaction server. The communication(s) may include a transaction identifier and/or transaction status information, such as an indication that goods or services are received according to the delegated transaction, or alternatively, an indication that goods or services are not received according to the delegated transaction. The received communication(s) may be parsed by the receiving computer to calculate transaction status and determine an appropriate automated response to take in response to the received communication. In some embodiments, the received communication may include final payment amount data, to be used for example in operation 305. These embodiments allow final payment amount to be determined at the time goods are received. For example, when the product to be purchased is gasoline, the final price for filling a tank may not be known beforehand.

In a "Automatically Initiate Transaction Payment" operation/module 305, an automated action may be taken by the delegation module 300 in response to the communication(s) received from the delegate mobile device. One such operation may include automatically initiating payment to the merchant in response to receiving the indication from the delegate mobile device. In embodiments where the delegation module may be installed on a customer computing device, automatically initiating transaction payment may include establishing a communication connection to a secure transaction server and sending transaction data to the transaction server over the communication connection. In embodiments where the delegation module may be installed on a merchant transaction server, automatically initiating transaction payment may include communicating a payment request to a bank. In embodiments where the delegation module may be installed on a bank transaction server, automatically initiating transaction payment may include initiating a transfer of funds from a customer to a merchant account.

In "Automatically Send Payment Confirmations to Merchant/Delegate/Customer" operation/module 306, communications such as emails, voice or text messages may be sent to these various entities to document and confirm a completed transaction. Similarly, if a transaction is not completed, communications may be sent to appropriate entities to document the failed transaction.

Figure 7:
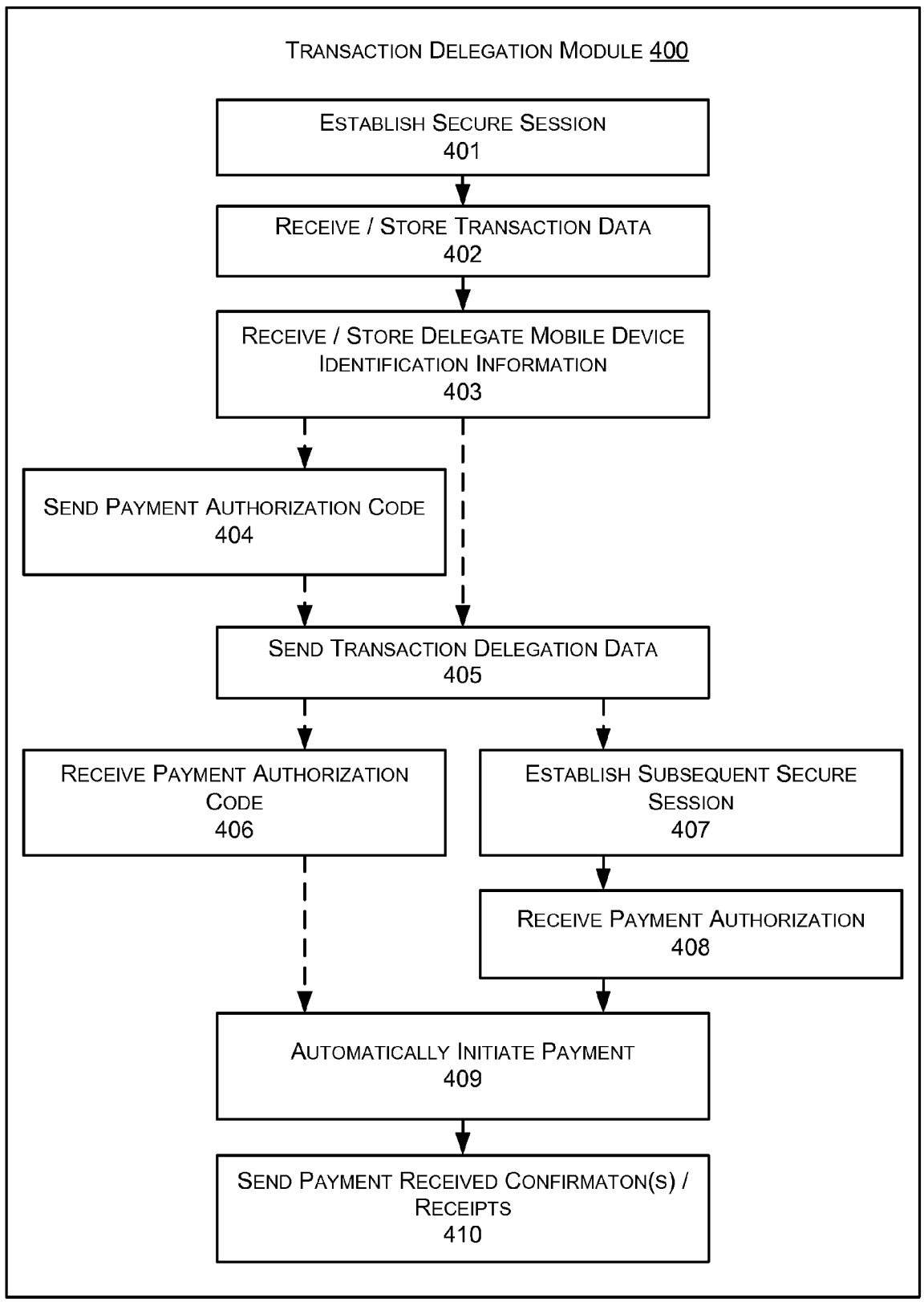
FIG. 7 is a flow diagram illustrating an example method that may be performed in connection with completing a delegated transaction.

FIG. 7 is a flow diagram illustrating an example method that may be performed in connection with completing a delegated transaction, in accordance with the present disclosure. FIG. 7 also represents modules as may be included in a transaction delegation module 400, for example, a delegation module for use in connection with FIG. 3 or FIG. 4. In FIG. 7, operations/modules 401-410 are illustrated as being performed sequentially, with operation/module 401 first and operation/module 410 last. Note that the some operations/modules show two dashed arrows as a way of depicting that two different options may be performed after certain operations. It will be appreciated however that these operations/modules may be re-ordered as convenient to suit particular embodiments.

Delegation module 400 may include one or more of operations/modules 401-410. Operations/modules 401-410 may include a "Establish Secure Session" operation/module 401, a "Receive and Store Transaction Data" operation/module 402, a "Receive and Store Delegate Mobile Device Identification Information" operation/module 403, a "Send Payment Authorization Code" operation/module 404, and a "Send Transaction Delegation Data" operation/module 405, a "Receive Payment Authorization Code" operation/module 406, a "Establish Subsequent Secure Session" operation/module 407, a "Receive Payment Authorization" operation/module 408, a "Automatically Initiate Payment" operation/module 409, and/or a "Send Payment Received Confirmation(s)/Receipts" operation/module 410.

In a "Establish Secure Session" operation/module 401, a secure online session may be initiated between a customer secure computing device and a merchant secure computing device and/or transaction server. Establishing the secure session may thus entail one or more protocol handshakes to establish communications on secure communication channels.

In "Receive and Store Transaction Data" operation/module 402, the merchant secure computing device and/or transaction server may receive, during the secure session, transaction data including from a customer computing device. The received transaction data may include any of the transaction data set forth herein, including for example one or more of a provisional customer payment funds source identification such as bank account or credit card information, an authorized payment amount, an identification of goods, and/or a merchant identification. In some embodiments, the transaction data may be received by customer entry of data in one or more webpage forms made available via a merchant website supported by a transaction server. The received transaction data may be stored for subsequent retrieval and use.

In "Receive and Store Delegate Mobile Device Identification Information" operation/module 403, the merchant secure computing device and/or transaction server may receive and store delegate mobile device identification information for a device associated with a merchant delegate. Delegate mobile device identification information may be received for example by merchant entry of a delegate mobile device cellular telephone number in a UI provided by the delegation module 400. The merchant may open a transaction that has been initiated during the secure session of operation 401, which may for example be ready for delivery of goods. The merchant may specify delegate mobile device identification information for a merchant delegate that may deliver the goods of the transaction to the customer. In some embodiments, delegate mobile device identification information can be stored with the various other transaction data associated with a particular transaction.

FIG. 7 illustrates first embodiments comprising operations 404, 405, and 406, along with the other illustrated operations. Turning first to these first embodiments, in "Send Payment Authorization Code" operation/module 404, the merchant secure computing device and/or transaction server may send a payment authorization code to a customer device during the secure session associated with operation 401. For example, upon successful entry of transaction data, a customer may be advised that payment would not be required until customer approval of goods or services delivered, and the customer would be given a code, such as 12345, to indicate customer approval of the goods or services.

In "Send Transaction Delegation Data" operation/module 405, the merchant secure computing device and/or transaction server may send transaction delegation data associated with a transaction to a delegate mobile device. The transaction delegation data may include, for example, any of the transaction delegation data provided herein, including a transaction identifier, delegation instructions, customer name and address, and goods identifications. This information may be sent for example via email, voice, or SMS text message.

In a "Receive Payment Authorization Code" operation/module 406, the payment authorization code of operation 404 may be received at the merchant secure computing device and/or transaction server. In some embodiments, the payment authorization code may be received the from the delegate mobile device, for example in the form of a reply to a text message sent in step 405, wherein such receiving of the payment authorization code constitutes receiving the customer authorization of payment from the provisional customer payment funds source. For example, the customer may supply the code to a merchant delegate in a interaction in which goods associated with the transaction are delivered, and the merchant delegate may then communicate (e.g. via a text message) the approval code back to the delegation module. In other embodiments, the code may be received from any other device, so long as it identifies a transaction and correct associated approval code. The code may for example be received from the customer computing device or a customer mobile device.

FIG. 7 illustrates second embodiments comprising operations 405, 407 and 408, along with the other illustrated operations. Turning now to these second embodiments, in a "Send Transaction Delegation Data" operation/module 405, the merchant secure computing device and/or transaction server may send transaction delegation data associated with a transaction to a delegate mobile device, as set forth above.

In a "Establish Subsequent Secure Session" operation/module 407, a subsequent secure online session, subsequent to the session of operation 401, may be initiated between a customer secure computing device and a merchant secure computing device and/or transaction server. Here, upon delivery of goods associated with a transaction, the customer may initiate a subsequent secure session with the merchant secure computing device and/or transaction server for the purpose of indicating approval or rejection of the delivered goods. In some embodiments, an email may be sent to a customer email address with transaction data entered in the secure session of operation 401, and a link to open a subsequent secure session for the purpose of approving goods when delivered and authorizing payment therefore. The subsequent secure session may for example be initiated by customer selection of the provided link, and merchant secure computing device and/or transaction server protocol handshakes with the customer device from which the link may be selected.

In "Receive Payment Authorization" operation/module 408, a customer payment authorization may be received at merchant secure computing device and/or transaction server. For example, a webpage accessed via the link discussed with reference to operation 407 may provide a UI for approving/rejecting delivered goods or services. If the approval UI is selected, an authorization indication may be received at the secure computing device and/or transaction server.

The remaining steps 409 and 410 may be carried out in connection with both of the embodiments described above. In a "Automatically Initiate Payment" operation/module 409, the merchant secure computing device and/or transaction server may automatically, i.e., without human involvement, initiate payment on a transaction for which goods are delivered and approved, using for example a provisional customer payment funds source identified in the transaction data supplied during the secure session of operation 401. In embodiments where the delegation module 400 is operated by a merchant, operation 409 may comprise an automated communication with a merchant bank. In embodiments where the delegation module 400 is operated by a bank, operation 409 may comprise an automated electronic payment or transfer of funds from a customer to a merchant account.

In a "Send Payment Received Confirmation(s)/Receipts" operation/module 410, the merchant secure computing device and/or transaction server may automatically send a payment received indication to the delegate mobile device in response to receiving the customer authorization of payment, for example via the approval code of operation 404, or via the subsequent session method of operation 407. Additional confirmations and receipts may also be generated and sent, for example to the customer.

Figure 8:
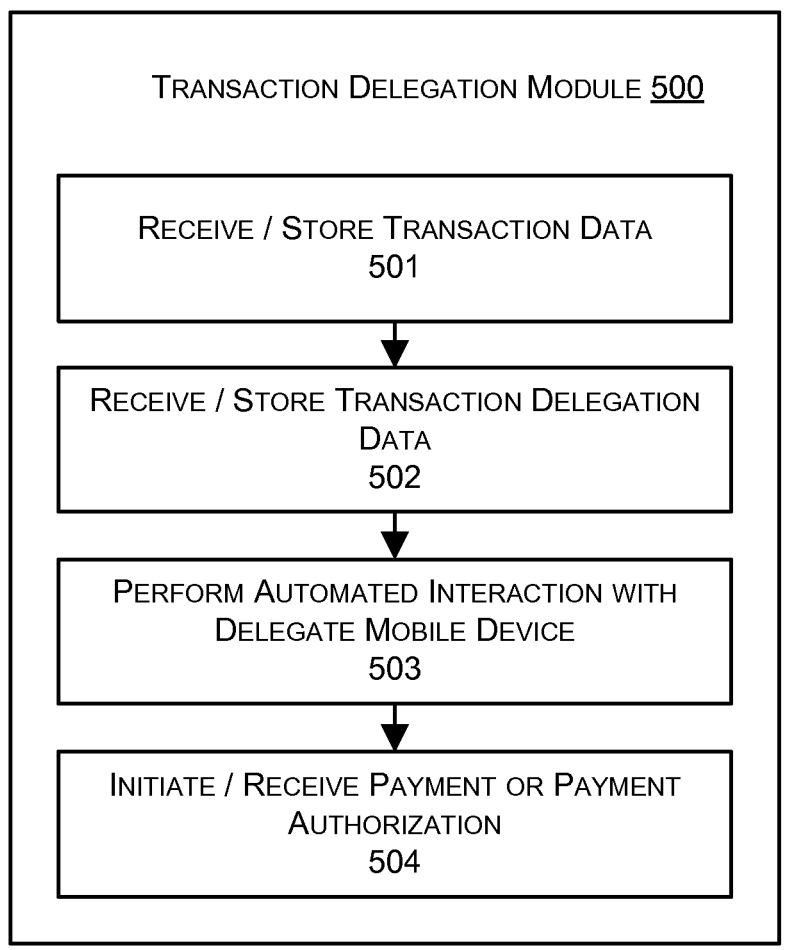
FIG. 8 is a flow diagram illustrating an example method that may be performed in connection with completing a delegated transaction.

FIG. 8 is a flow diagram illustrating an example method that may be performed in connection with completing a delegated transaction, in accordance with the present disclosure. FIG. 8 also represents modules as may be included in a transaction delegation module 500. In FIG. 8, operations/modules 501-504 are illustrated as being performed sequentially, with operation/module 501 first and operation/module 504 last. It will be appreciated however that these operations/modules may be re-ordered as convenient to suit particular embodiments, and that these operations/modules or portions thereof may be performed concurrently in some embodiments.

Delegation module 500 may include one or more of operations/modules 501-504. Operations/modules 501-504 may include a "Receive and Store Transaction Data" operation/module 501, a "Receive and Store Transaction Delegation Data" operation/module 502, a "Perform Automated Interaction with Delegate Mobile Device" operation/module 503, and/or a "Initiate/Receive Payment or Payment Authorization" operation/module 504.

In a "Receive and Store Transaction Data" operation/module 501, any device equipped with an appropriately configured delegation module 500 may receive and store transaction data associated with delegated transactions, the transaction data comprising, for example, one or more of an authorized payment amount, an identification of goods, a provisional customer payment funds source identification, a merchant identification, and/or any of the transaction data set forth herein. The device receiving the transaction data may be a customer secure computing device, a merchant secure computing device, or a bank or other third party transaction server as described herein.

In "Receive and Store Transaction Delegation Data" operation/module 502, any device equipped with an appropriately configured delegation module 500 may receive and store transaction delegation data, for example delegate mobile device identification information, and/or any of the transaction delegation data set forth herein.

In "Perform Automated Interaction with Delegate Mobile Device" operation/module 503, the computing device of operations 501 and 502 may perform an automated interaction with a delegate mobile device stored according to operation 501, the automated interaction comprising one or more of automatically initiating a payment from a provisional customer payment funds source in response to a communication from a delegate mobile device, for example, in embodiments such as those illustrated in FIG. 1 and FIG. 2, and automatically communicating with a delegate mobile device in response to receiving a customer authorization of payment from the provisional customer payment funds source, for example, in embodiments such as those illustrated in FIG. 3 and FIG. 4.

In a "Initiate/Receive Payment or Payment Authorization" operation/module 504, computing device of operations 501 and 502 may for example initiate a payment on a transaction in connection with the transaction for which the automated interaction of operation 503 was performed.

Figure 9:
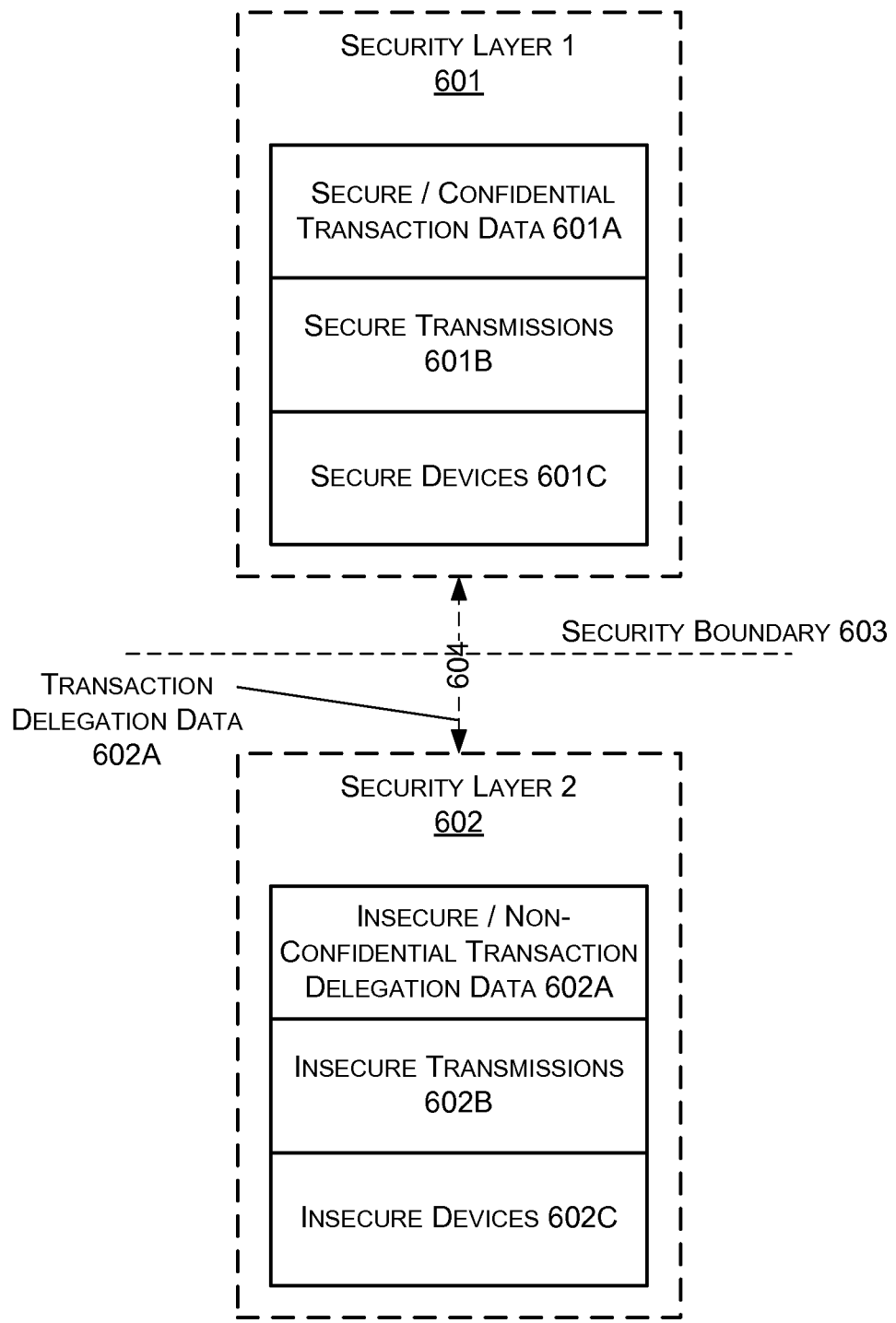
FIG. 9 is a schematic diagram illustrating a first and second security layer; all arranged in accordance with the present disclosure.

FIG. 9 is a schematic diagram illustrating a first and second security layer, in accordance with the present disclosure. FIG. 9 comprises a first security layer 601 which includes "Secure/Confidential Transaction Data" 601A, "Secure Transmissions" 601B, and "Secure Devices" 601C; a second security layer 602 which includes "Insecure/Non-Confidential Transaction Delegation Data" 602A, "Insecure Transmissions" 602B, and "Insecure Devices" 602C; and a security boundary 603 between security layer 601 and security layer 602. Security layer 601 and security layer 602 may be coupled by a communications connection 604 across which transaction delegation data 602A may be transmitted.

FIG. 9 illustrates an organizational model for devices, transmissions, and data according to some embodiments, in which more secure devices 601C in layer 601 delegate transaction operations across boundary 603 to less secure devices 602C in layer 602. The devices 601C may be configured to communicate confidential transaction data 601A among each other using secure transmissions 601B. However, devices 601C are configured not to allow such confidential data across boundary 603. Instead, only non-confidential transaction delegation data 602A may be transmitted by devices 601C across boundary 603. For example, secure devices 601C such as a secure customer or merchant computing device and secure transaction server may implement the illustrated architecture by being equipped with appropriate hardware and software as described herein, to communicate data 601A among between the security-enabled devices 601C using secure transmissions 601B. However, when communicating to an insecure device 602C such as a basic, minimally-featured cellular telephone, the security-enabled computing devices 601C may restrict communications to minimize the sensitivity of the data 602A that crosses the boundary 603. Information such as bank and credit card account numbers or other financial account information is an example of information that would likely not be allowed across boundary 603.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art.

The invention claimed is:

1. A method for completing, by a customer secure computing device, a secure transaction between a customer and a merchant, wherein the customer is associated with the customer secure computing device and a delegate mobile device, the method comprising:

acquiring customer delegate mobile device identification information and secure transaction data, by the customer secure computing device, comprising:

receiving, by the customer secure computing device, secure transaction data associated with a delegated transaction, the secure transaction data comprising a merchant identification associated with the merchant;

receiving, by the customer secure computing device, customer delegate mobile device identification information associated with a customer delegate mobile device authorized by the customer for the delegated transaction with the merchant; and storing, by the customer secure computing device, the secure transaction data and customer delegate mobile device identification information; and subsequent to acquiring customer delegate mobile device identification information and secure transaction data by the customer secure computing device, automatically completing the secure transaction, by the customer secure computing device, in response to receiving a communication from the identified previously authorized customer delegate mobile device, comprising:

receiving, by the customer secure computing device, a communication from the identified previously authorized customer delegate mobile device;

checking, by the customer secure computing device, a status identifier in the communication from the identified previously authorized customer delegate mobile device; and automatically initiating, by the customer secure computing device, using the secure transaction data, payment to the merchant by the customer secure computing device in response to receiving the communication from the identified previously authorized customer delegate mobile device, when the status identifier indicates that the delegated transaction is complete.

2. The method of claim 1, further comprising automatically sending, by the customer secure computing device, a payment confirmation to the merchant in response to successfully initiating payment according to the automatically initiating payment operation.

3. The method of claim 1, further comprising automatically sending, by the customer secure computing device, a payment confirmation to the identified customer delegate mobile device in response to successfully initiating payment according to the automatically initiating payment operation.

4. The method of claim 1, further comprising sending, by the customer secure computing device, an instruction to enter the delegated transaction to the identified customer delegate mobile device in response to receiving the delegate mobile device identification information.

5. The method of claim 1, the secure transaction data further comprising one or more of an authorized payment amount, a provisional customer payment funds source identification, and/or an identification of goods.

6. The method of claim 1, further comprising receiving, by the customer secure computing device, payment amount data from the identified customer delegate mobile device.

7. The method of claim 1, wherein automatically initiating payment to the merchant comprises establishing a communication connection to a secure transaction server, wherein the communication connection is utilized for automatically initiating payment.

8. A method for completing, by a secure transaction server, a secure transaction between a customer and a merchant, wherein the customer is associated with a customer secure computing device and a customer delegate mobile device, the method comprising:

acquiring customer delegate mobile device identification information and secure transaction data, by the secure transaction server, comprising:

receiving by the secure transaction server from the customer secure computing device, secure transaction data and customer delegate mobile device identification information over a secure communication connection with a customer delegation client, wherein the secure transaction data is associated with a delegated transaction and comprises a merchant identification associated with the merchant, and wherein the customer delegate mobile device identification information is associated with a customer delegate mobile device authorized by the customer for the delegated transaction with the merchant; and storing, by the secure transaction server, the secure transaction data and customer delegate mobile device identification information; and subsequent to acquiring customer delegate mobile device identification information and secure transaction data by the secure transaction server, automatically completing the secure transaction, by the secure transaction server, in response to receiving a communication from the identified previously authorized customer delegate mobile device, comprising:

receiving, by the secure transaction server, a communication from the identified previously authorized customer delegate mobile device;

checking, by the secure transaction server, a status identifier in the communication from the identified previously authorized customer delegate mobile device; and automatically initiating, by the secure transaction server, using the secure transaction data, a payment to the merchant in response to receiving the communication from the identified previously authorized customer delegate mobile device, when the status identifier indicates that the delegated transaction is complete.

9. A method for completing a secure transaction between a customer and a merchant, wherein the customer is associated with a customer secure computing device and the merchant is associated with a secure transaction server and a merchant delegate mobile device, the method for the secure transaction server comprising:

acquiring merchant delegate mobile device identification information and secure transaction data, by the secure transaction server, comprising:

establishing by the secure transaction server a secure session over a network connection with the customer secure computing device;

during the secure session, receiving by the secure transaction server, from the customer secure computing device, transaction data, wherein the transaction data includes a provisional customer payment funds source identification;

during the secure session, sending by the secure transaction server to the customer secure computing device a payment authorization code;

receiving by the secure transaction server, from the merchant, merchant delegate mobile device identification information associated with a merchant delegate mobile device authorized by the merchant for delegated merchant transactions; and storing, by the secure transaction server, the secure transaction data and customer delegate mobile device identification information; and subsequent to acquiring merchant delegate mobile device identification information and secure transaction data by the secure transaction server, completing the secure transaction, by the secure transaction server, wherein completing the secure transaction comprises automatically interacting with the identified previously authorized merchant delegate mobile device, comprising:
subsequent to the secure session, receiving by the secure transaction server, a communication from the identified previously authorized merchant delegate mobile device, the communication comprising the payment authorization code indicating a subsequent-customer authorization of payment from the provisional customer payment funds source identified by the provisional customer payment funds source identification; and
in response to receiving the payment authorization code indicating subsequent customer authorization of payment from the provisional customer payment funds source, automatically sending by the secure transaction server a communication to the previously authorized merchant delegate mobile device identified in the merchant delegate mobile device identification information.

10. The method of claim 9, wherein the secure transaction server is implemented by a merchant computer configured as a merchant delegation client.

11. The method of claim 9, wherein the secure transaction server is implemented by a merchant bank delegation server.

12. The method of claim 9, further comprising automatically sending an electronic payment receipt to the customer secure computing device.

13. The method of claim 9, the secure transaction data further comprising one or more of an authorized payment amount, an identification of goods, and/or a merchant identification.

14. The method of claim 9, further comprising sending transaction delegation data to the identified merchant delegate mobile device.

15. A non-transitory computer readable storage medium having instructions that when executed by a secure computing device comprising either a customer secure computing device or a secure transaction server complete a secure transaction between a customer and a merchant, wherein a delegate mobile device interacts with the secure computing device to complete the secure transaction, the instructions for the secure computing device comprising:
acquiring delegate mobile device identification information and secure transaction data by the secure computing device, comprising:
receiving secure transaction data associated with a delegated transaction, the secure transaction data comprising one or more of an authorized payment amount, an identification of goods, a provisional customer payment funds source identification, and/or a merchant identification;
receiving delegate mobile device identification information associated with a delegate mobile device that is authorized for the delegated transaction;
storing the secure transaction data and delegate mobile device identification information; and
subsequent to acquiring delegate mobile device identification information and secure transaction data by the secure computing device, completing the secure transaction by the secure computing device, wherein completing the secure transaction comprises automatically interacting with the identified previously authorized delegate mobile device, comprising:
automatically interacting with the previously authorized delegate mobile device identified by the delegate mobile device identification information, the automatically interacting comprising one or more of:
automatically initiating a payment from the provisional customer payment funds source in response to a communication comprising a status identifier from the identified previously authorized delegate mobile device, when the status identifier indicates that the delegated transaction is complete; or
automatically communicating with the identified previously authorized delegate mobile device in response to receiving a customer payment authorization code from the identified previously authorized delegate mobile device, the payment authorization code indicating customer authorization of payment from the provisional customer payment funds source.

16. The non-transitory computer readable storage medium of claim 15, wherein the non-transitory computer readable medium implements a customer delegation client.

17. The non-transitory computer readable storage medium of claim 15, wherein the non-transitory computer readable medium implements a merchant delegation client.

18. The non-transitory computer readable storage medium of claim 15, wherein the non-transitory computer readable medium implements a bank delegation server.

* * * * *